US010875195B2

(12) United States Patent
Zitting et al.

(10) Patent No.: US 10,875,195 B2
(45) Date of Patent: Dec. 29, 2020

(54) ROBOT GRIPPER

(71) Applicants: Gordon T. Zitting, Hurricane, UT (US); Lorin B. Zitting, Colorado City, AZ (US)

(72) Inventors: Gordon T. Zitting, Hurricane, UT (US); Lorin B. Zitting, Colorado City, AZ (US)

( * ) Notice: Subject to any disclaimer, the term of this patent is extended or adjusted under 35 U.S.C. 154(b) by 28 days.

(21) Appl. No.: 16/016,296

(22) Filed: Jun. 22, 2018

(65) Prior Publication Data

US 2018/0370044 A1 Dec. 27, 2018

Related U.S. Application Data

(60) Provisional application No. 62/523,685, filed on Jun. 22, 2017.

(51) Int. Cl.
| | |
|---|---|
| *B25J 15/08* | (2006.01) |
| *B25J 15/04* | (2006.01) |
| *F15B 15/10* | (2006.01) |
| *B25J 15/00* | (2006.01) |
| *B25J 9/14* | (2006.01) |

(52) U.S. Cl.
CPC .............. *B25J 15/08* (2013.01); *B25J 9/142* (2013.01); *B25J 15/0023* (2013.01); *B25J 15/0475* (2013.01); *F15B 15/10* (2013.01)

(58) Field of Classification Search
CPC .. B25J 15/0023; B25J 15/0033; B25J 15/024; B25J 15/0293; B25J 15/08; B25J 15/04; B25J 15/0408; B25J 15/0475; B25J 9/142; F15B 15/10; F16J 3/06

USPC ............. 294/192, 196, 198, 208, 99.1, 119.3
See application file for complete search history.

(56) References Cited

U.S. PATENT DOCUMENTS

| | | | | |
|---|---|---|---|---|
| 3,343,864 A | * | 9/1967 | Baer | .................... B25J 15/0023 294/119.3 |
| 3,981,528 A | * | 9/1976 | Andorf | ................ B25J 15/0023 294/119.3 |
| 5,046,773 A | * | 9/1991 | Modesitt | .................... B25J 7/00 294/100 |

(Continued)

FOREIGN PATENT DOCUMENTS

| | | |
|---|---|---|
| DE | 4432253 A1 | 3/1996 |
| DE | 102006009559 B3 | 5/2007 |

(Continued)

*Primary Examiner* — Dean J Kramer
(74) *Attorney, Agent, or Firm* — Gurr Brande & Spendlove, PLLC; Robert A. Gurr

(57) ABSTRACT

A robot gripper has a housing having at least one flexible chamber, at least one finger channel, and at least one column channel; a finger configured to insert within the finger channel; and at least one column having a base with one or more ports, a conduit in communication with the ports, and one or more column apertures for access to the conduit; wherein the at least one column is configured to insert within the at least one column channel with the one or more column apertures aligning with the one or more flexible chambers such that the flexible chambers are in fluid communication with the conduit. As fluid enters a first set of chambers, the chambers expand, thereby pivoting the fingers attached thereto on a pivot point, bringing the working end of the fingers closer together.

13 Claims, 16 Drawing Sheets

(56) References Cited

U.S. PATENT DOCUMENTS

| | | | | |
|---|---|---|---|---|
| 5,263,753 | A | * | 11/1993 | Breu .................... B25J 15/0206 294/196 |
| 6,484,601 | B1 | * | 11/2002 | Arrichiello ................ B25J 9/14 294/106 |
| 8,011,708 | B2 | | 9/2011 | Becker et al. |
| 9,046,177 | B2 | * | 6/2015 | Tell .......................... F16J 3/043 |
| 2009/0315281 | A1 | * | 12/2009 | Tuauden .............. B25J 15/0475 279/142 |
| 2012/0025553 | A1 | * | 2/2012 | Fischer .................. B25J 15/022 294/198 |
| 2012/0286532 | A1 | | 11/2012 | Weber et al. |
| 2016/0001444 | A1 | | 1/2016 | Kwok et al. |
| 2016/0075036 | A1 | | 3/2016 | Lessing et al. |

FOREIGN PATENT DOCUMENTS

| | | | | |
|---|---|---|---|---|
| DE | 102007030036 | A1 | | 1/2009 |
| DE | 102011011942 | A1 * | 8/2012 | ........... B25J 9/0015 |
| DE | 102012100916 | A1 | | 8/2013 |
| EP | 0534778 | A2 | | 3/1993 |
| JP | 08300285 | A | | 11/1996 |
| WO | 2017083350 | A1 | | 5/2017 |
| WO | 2017127497 | A1 | | 7/2017 |
| WO | 2018009754 | A1 | | 1/2018 |

* cited by examiner

ROBOT GRIPPER

CROSS-REFERENCE TO RELATED APPLICATIONS

This application claims the benefit of U.S. Provisional Application Ser. No. 62/523,685, filed on Jun. 22, 2017, which is incorporated herein by reference.

TECHNICAL FIELD

The present disclosure relates to automated machinery and manufacturing. More particularly, the present disclosure relates to robot grippers.

BACKGROUND

The use of automated machinery has steadily increased over the years, particularly due to its ability to increase production speed while simultaneously reducing human error. Many systems require pneumatic grippers to grip and transport various components. Standard pneumatic grippers have internal sliding pistons and mechanisms to move two or more gripping fingers in unison. However, these grippers have several disadvantages, many of which result from the plurality of moving parts required. For example, due to the plurality of parts, there is increased friction, leading to energy loss and wear (resulting in both contamination and loss of precision). Further, the higher the number of parts, the higher the likelihood that one of those parts will fail. Likewise, the cost to manufacture the gripper is higher because of the manufacturing and assembly of multiple parts. Attempts have been made in the art to solve these problems. For example, some attempts include the use of bellows to actuate the gripper (e.g., U.S. Pat. No. 8,011,708). The '708 patent discloses the use of a rigid frame which flexes as the bellows unfold in response to pressure. However, rigid materials have limited fatigue life, leading to failure. Further, the bellows provided for in the '708 patent only provide for lateral expansion of the fingers, which limits the gripping range due to the width of the central frame section.

Another approach uses inflatable chambers with monolithic gripping fingers (e.g., DE4432253). However, finding a sufficiently rigid material for the fingers, while having the flexibility and elongation for the inflating chambers, represents a compromise.

Another limitation of robot grippers in the art is the inability of the grippers to be partially and/or slowly actuated for the precision gripping of delicate objects. In other words, once pressure is reached, the hydraulics generally cause the fingers to fully-open or fully-close, which creates a problem when gripping delicate objects.

Therefore, despite attempts in the prior art, there remains a need for a robot gripper that is relatively inexpensive to manufacture, has few moving parts, no sliding parts, that maintains uniformity in gripping, and that may be slowly or partially actuated for gripping delicate objects. The present disclosure seeks to solve these and other problems.

SUMMARY OF EXAMPLE EMBODIMENTS

A robot gripper comprises a housing, the housing comprising at least one flexible chamber, at least one finger channel, and at least one column channel; a finger, the finger configured to insert within the finger channel; and at least one column comprising a base with one or more ports, a conduit in communication with the ports, and one or more column apertures for access to the conduit; wherein the at least one column is configured to insert within the at least one column channel with the one or more column apertures aligning with the one or more flexible chambers such that the flexible chambers are in fluid communication with the conduit.

In one embodiment, a robot gripper comprises a base, at least one column, at least one chamber, and at least one finger.

In one embodiment, a robot gripper comprises an array of grippers, each gripper comprising a plurality of housing members coupled to a plurality of fingers, and an array of columns Each housing member comprises one or more chambers. In one embodiment, each column has a connection port through the base for the passage of fluid therein through a conduit. In another embodiment, the base has one or more channels therethrough, allowing the grippers to be controlled by as few as one connection port to the base.

DETAILED DESCRIPTION OF EXAMPLE EMBODIMENTS

Figure 1:
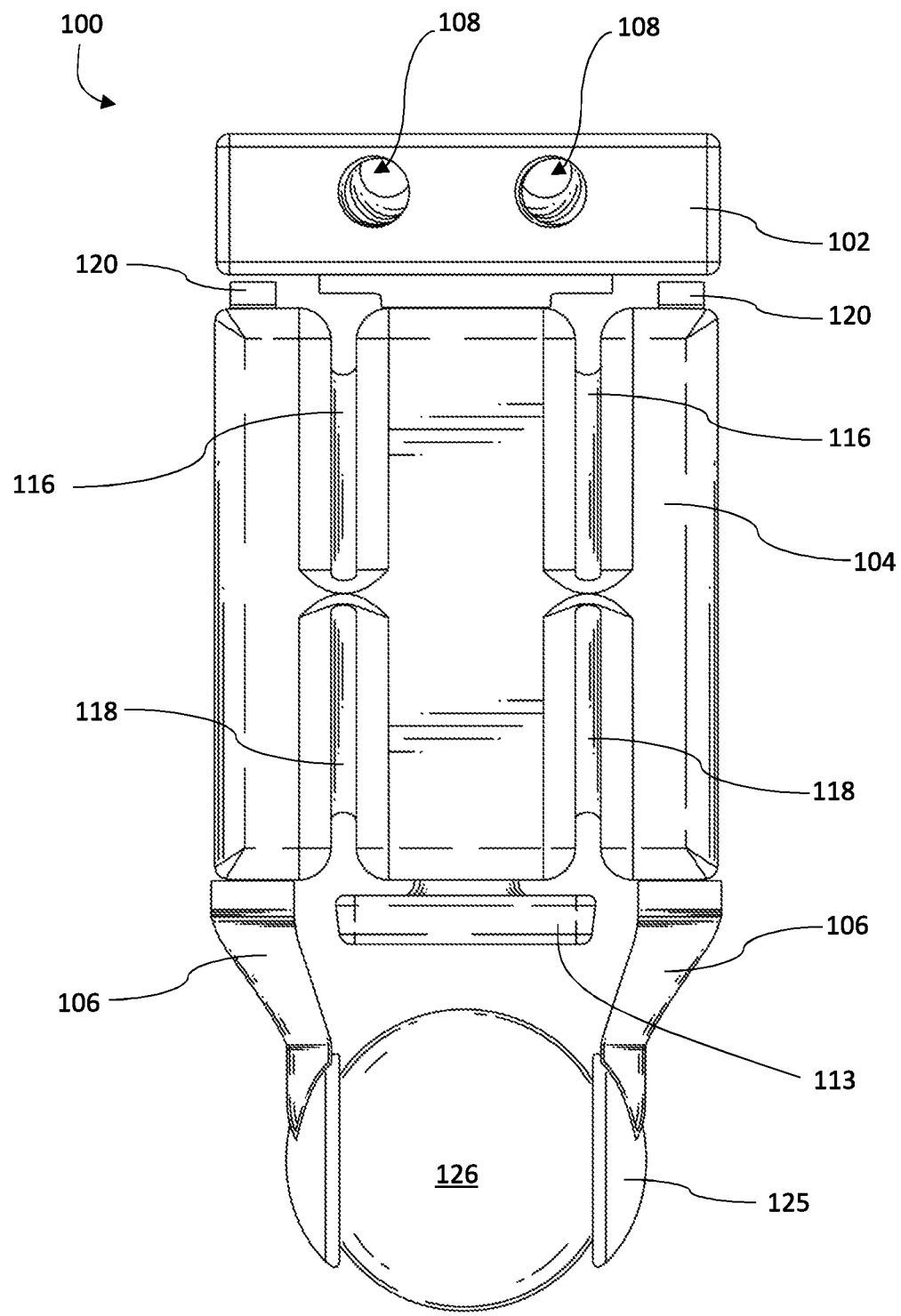
FIG. 1 is front elevation view of a robot gripper gripping a ball.
Figure 2:
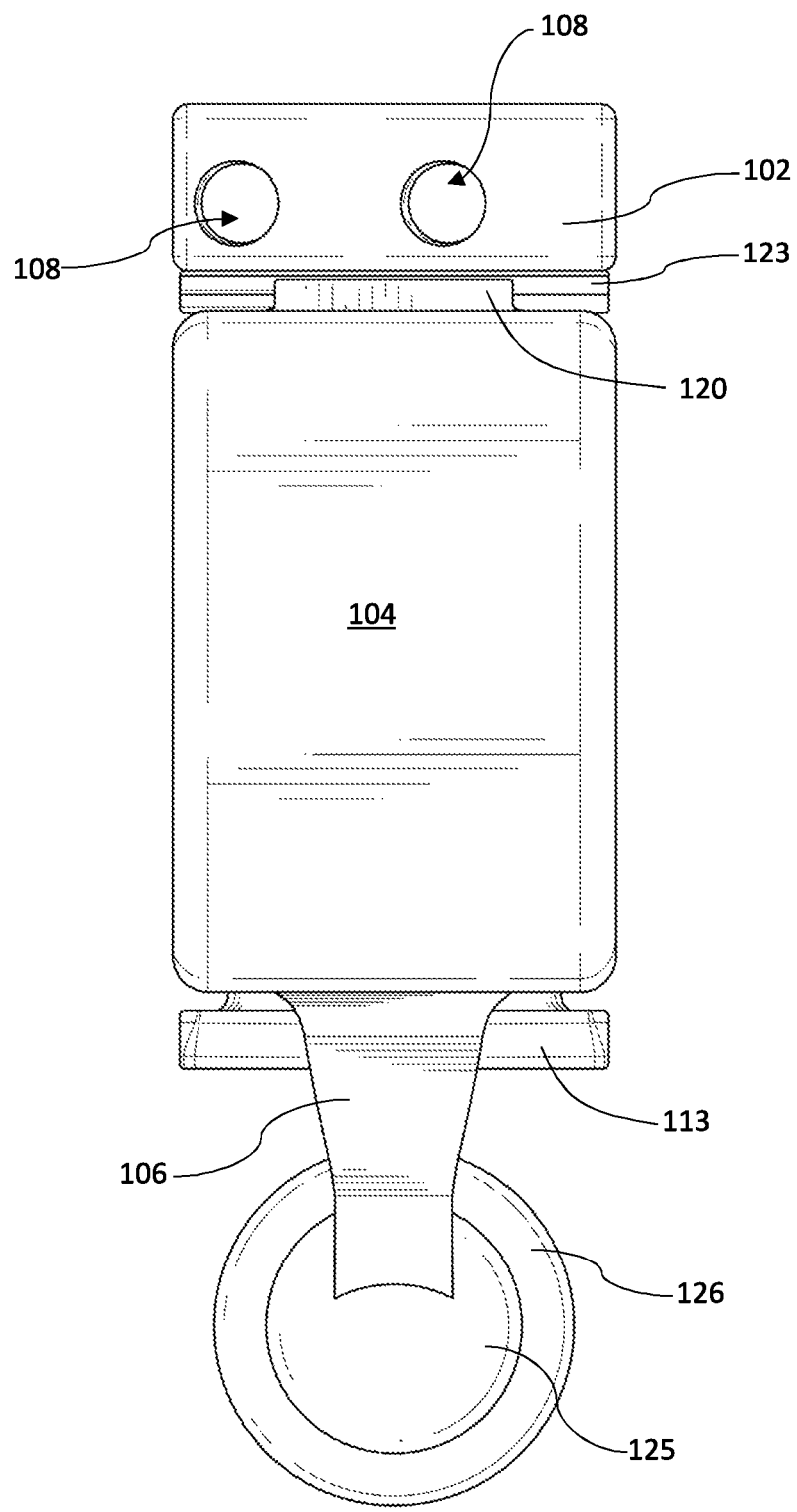
FIG. 2 is a side elevation view of a robot gripper gripping a ball.
Figure 3:
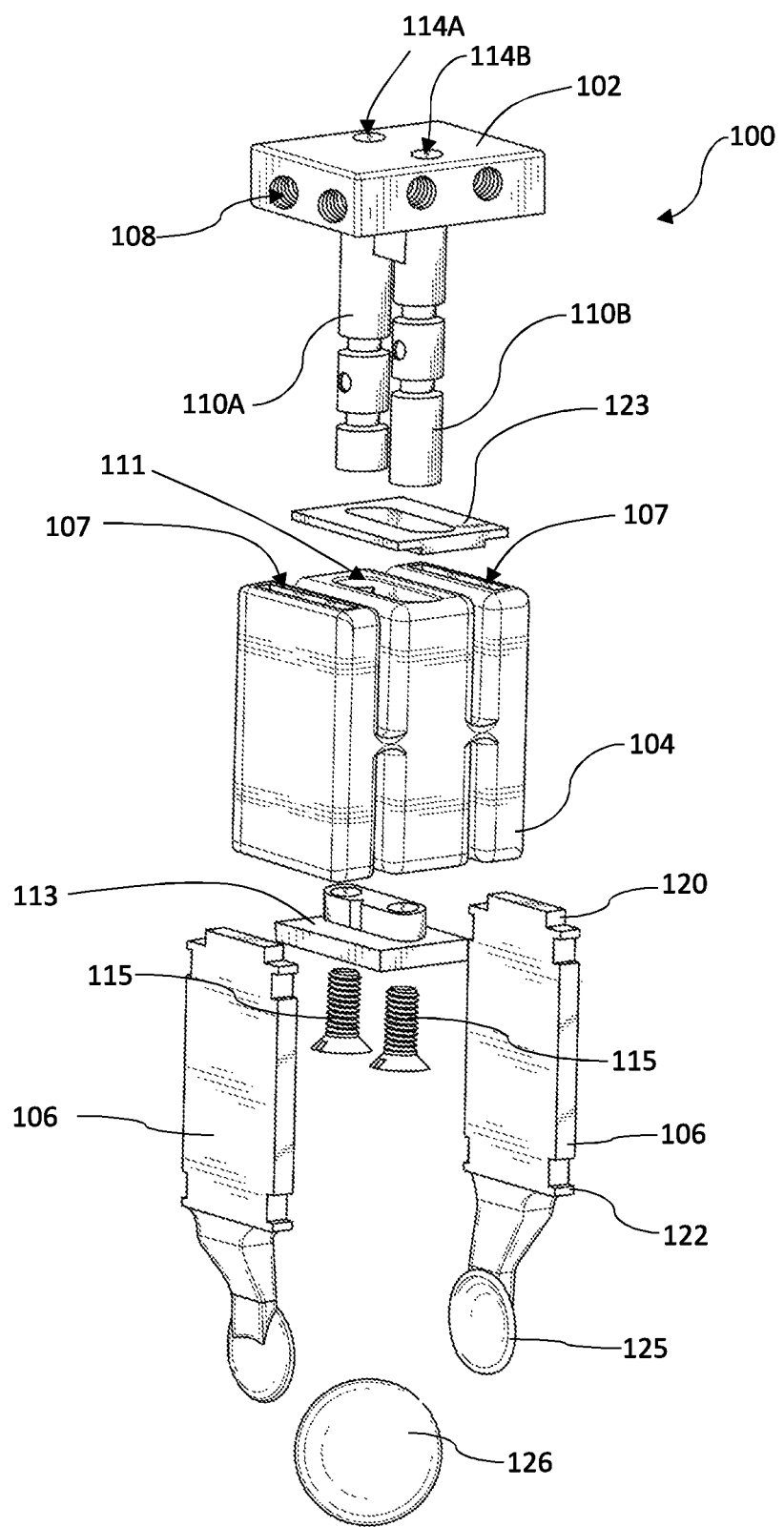
FIG. 3 is an exploded view of a robot gripper.
Figure 4:
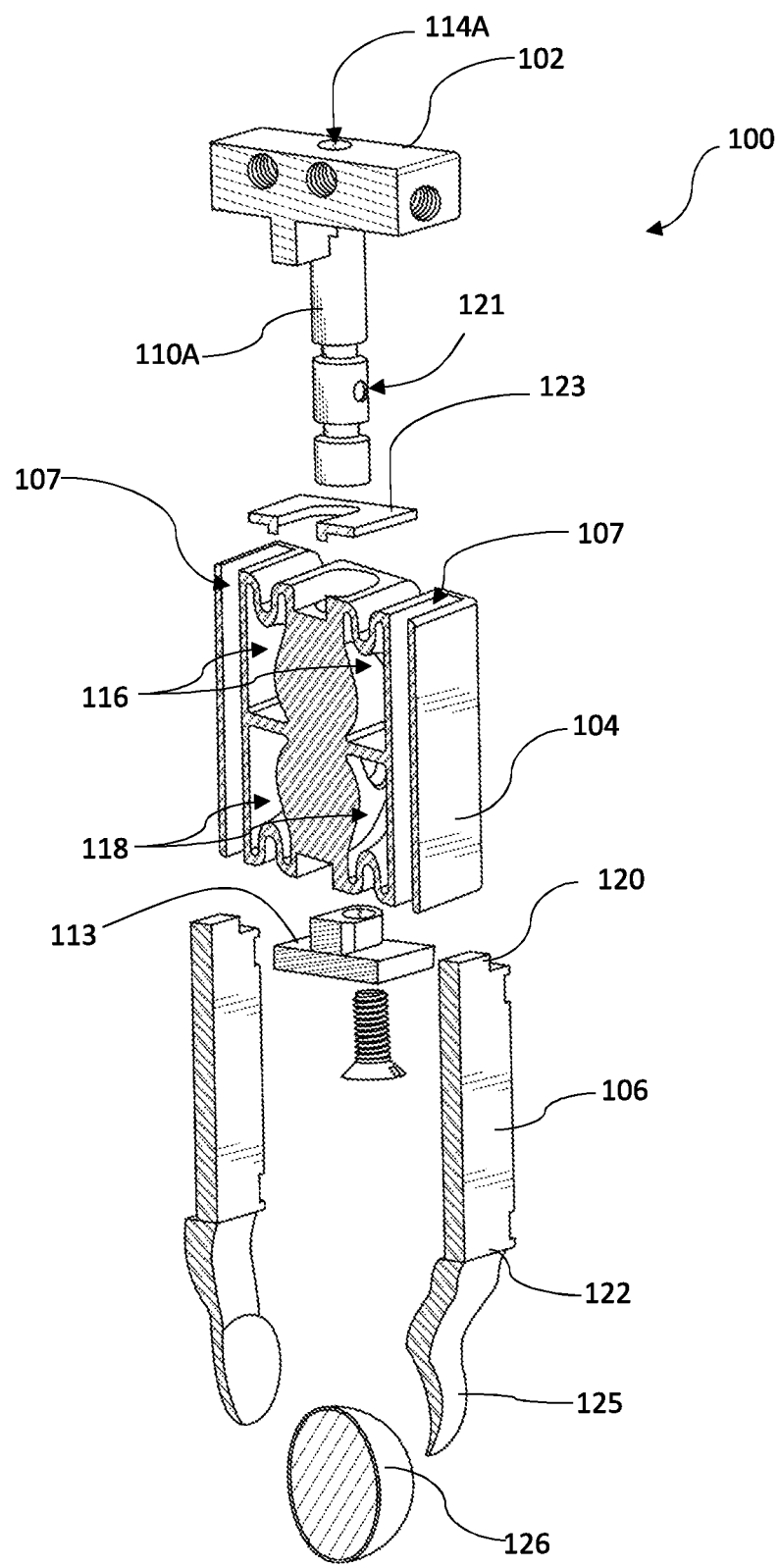
FIG. 4 is a cross-section of an exploded view of a robot gripper.
Figure 5:
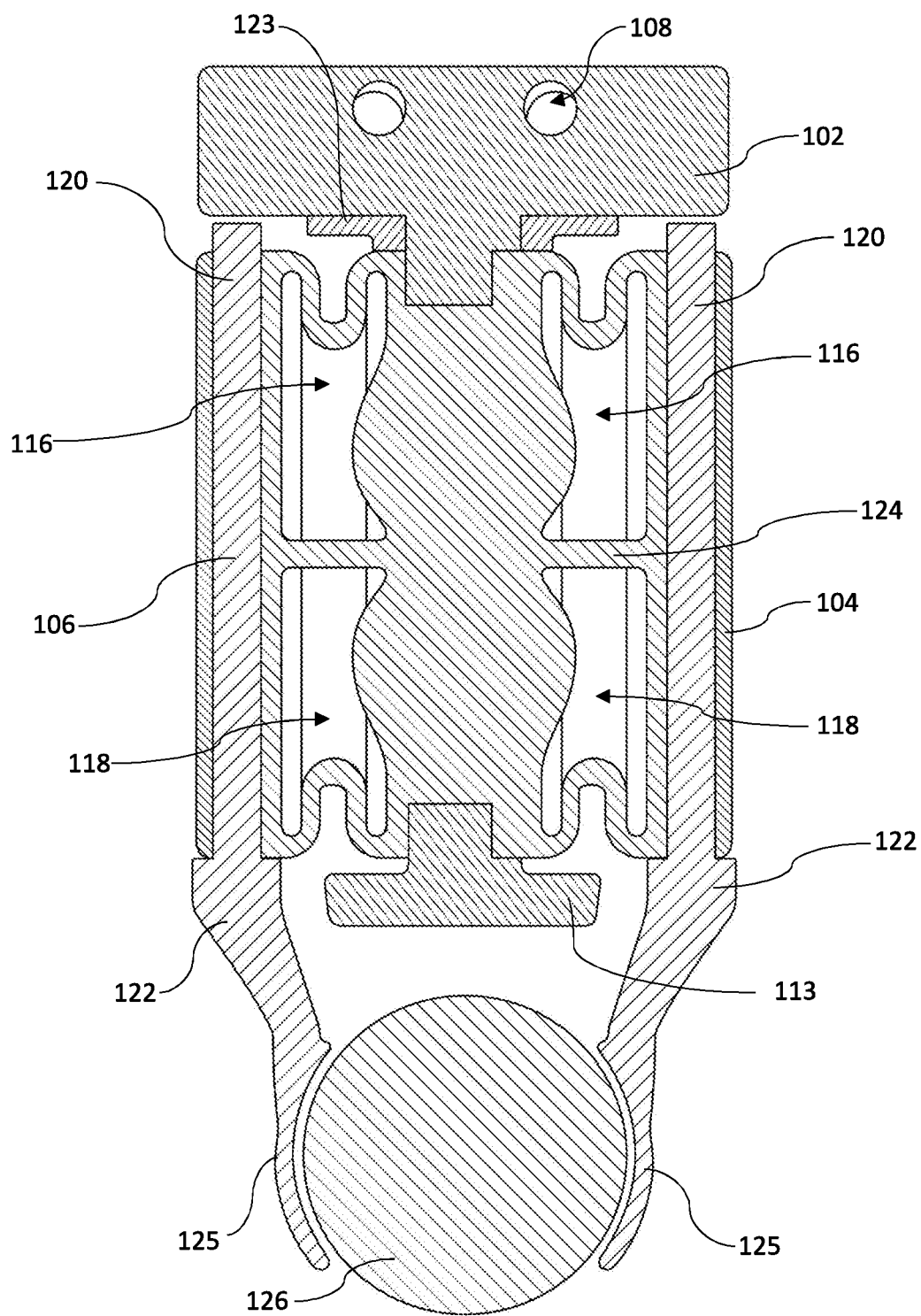
FIG. 5 is a front elevated cross-section of a robot gripper gripping a ball.
Figure 6:
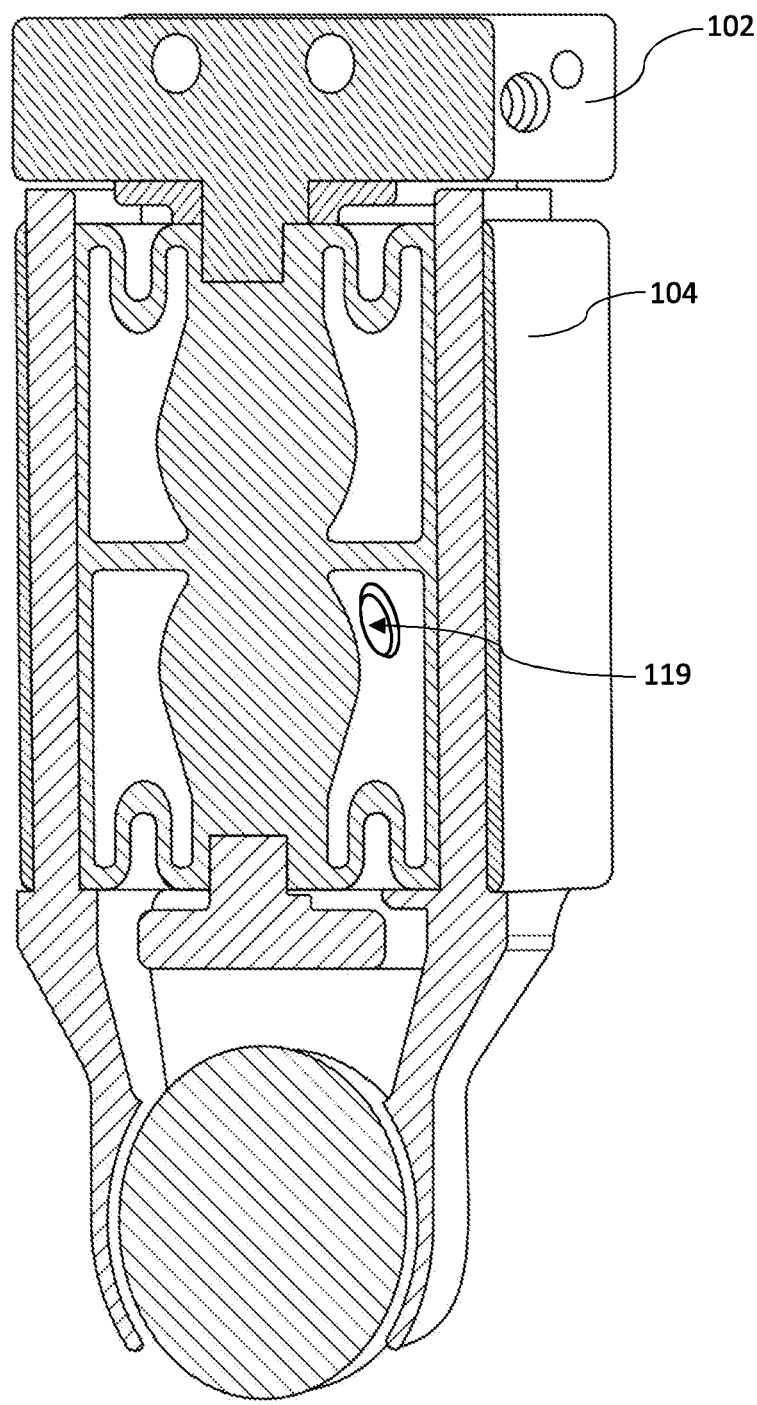
FIG. 6 is a perspective view cross-section of a robot gripper gripping a ball.
Figure 7:
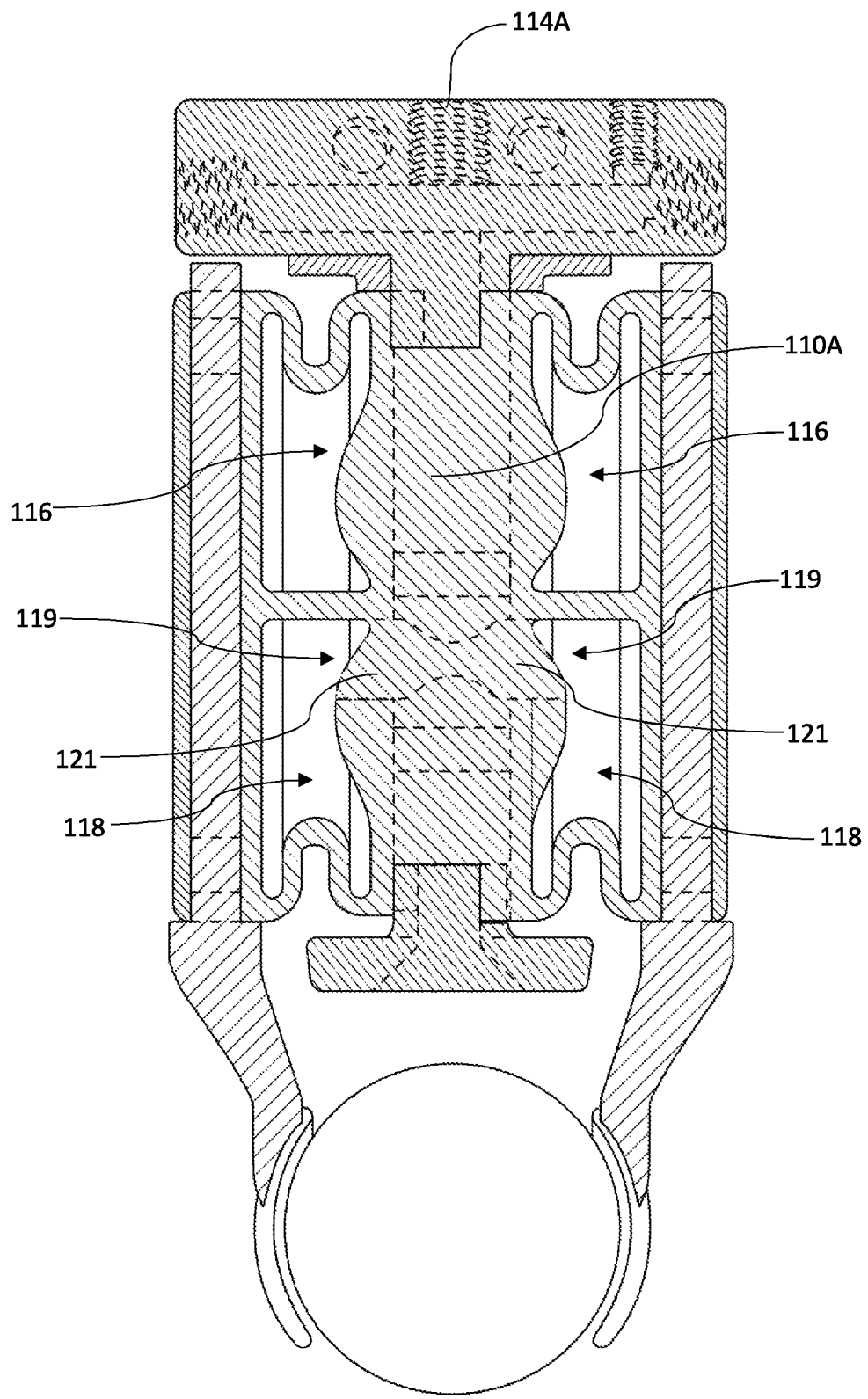
FIG. 7 is an internal view of a robot gripper gripping a ball.
Figure 8:
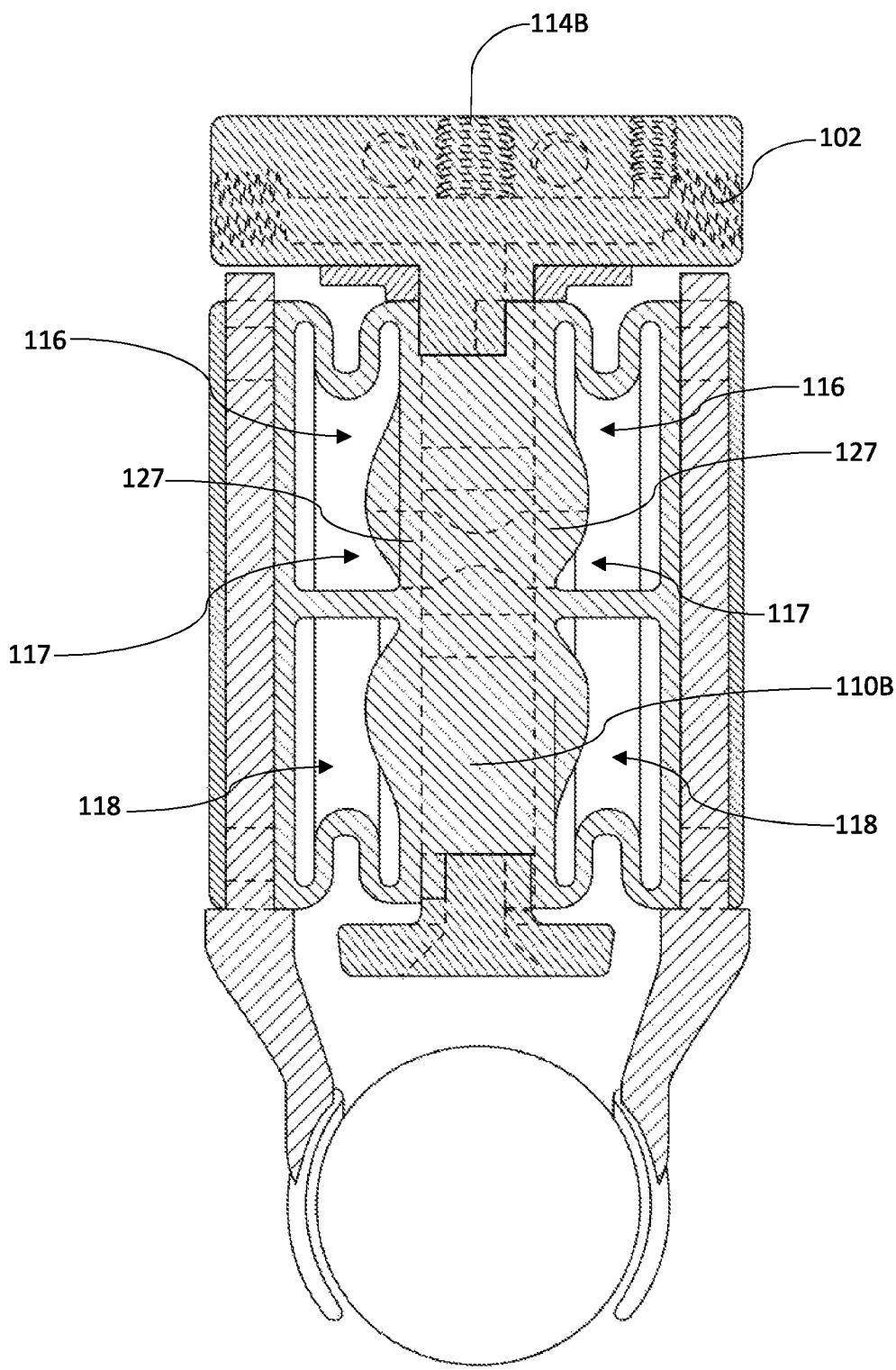
FIG. 8 is an internal view of a robot gripper gripping a ball.
Figure 9:
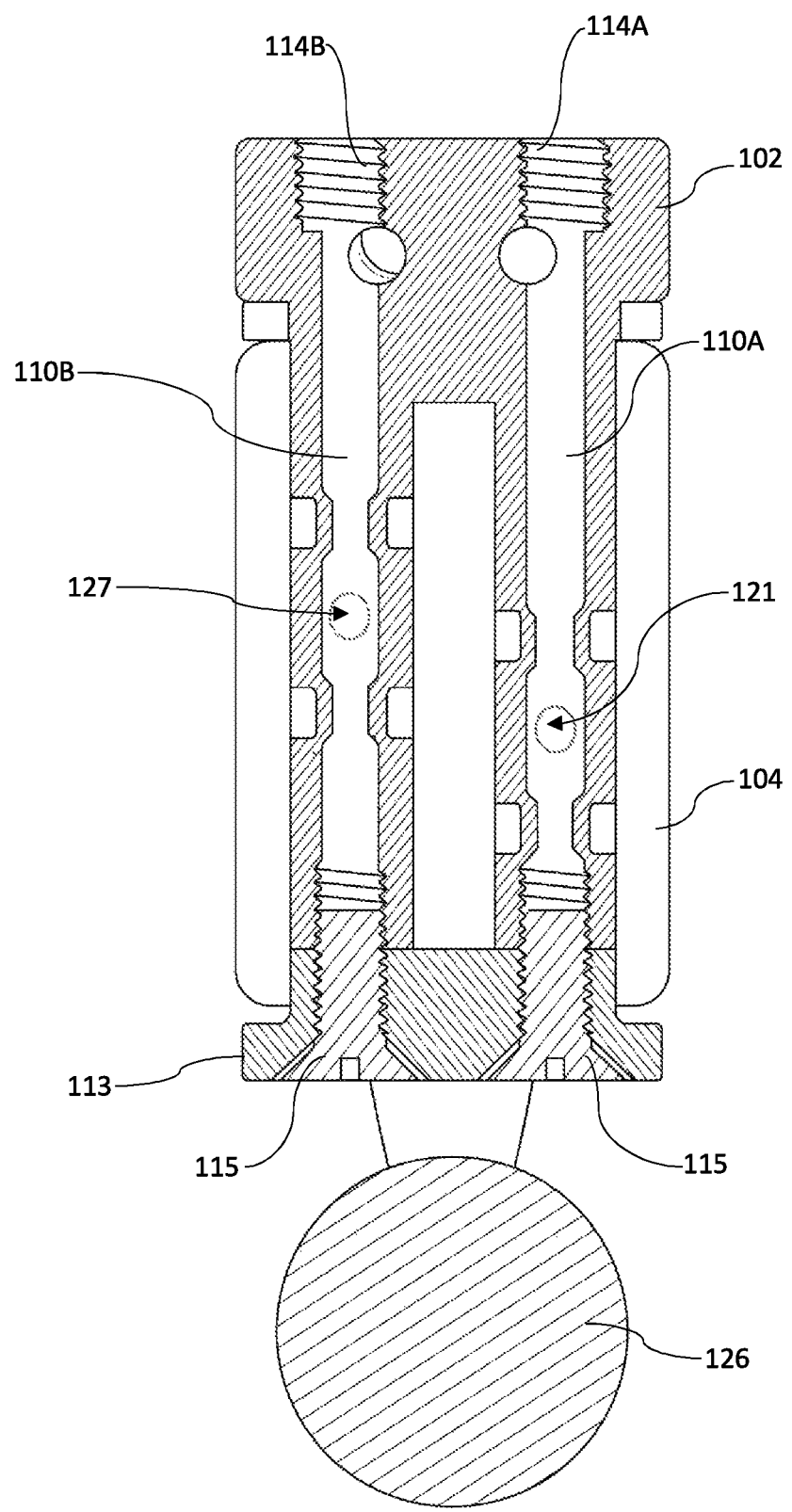
FIG. 9 is a side elevated view cross-section of a robot gripper gripping a ball.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a robot gripper that is relatively inexpensive to manufacture, has few moving parts, no sliding parts, that maintains uniformity in gripping, and that may be slowly or partially actuated for gripping delicate objects. The robot gripper disclosed herein solve these needs and others.

In one embodiment, as shown in FIGS. 1-9, a robot gripper 100 comprises a base 102, a housing 104, and a plurality of fingers 106. The base 102 comprises one or more mounting holes 108 (e.g., threaded holes for receiving a screw or bolt), at least one column 110A-B, a conduit running through the column 110A-B for the passage of fluid (or air or other medium), and at least one connection port 114A-B. The housing 104 is configured to receive the column 110 in a column channel 111. The columns may be secured to the housing 104 using a coupling plate 113 and screws 115. The housing 104 is further configured to receive the fingers 106 in finger channel 107, the finger channel(s) 107 are located in the outer portion of the housing 104, with the column channel 111 being interposed therebetween. The housing 104 further comprises a plurality of flexible chambers (first chambers 116 and second chambers 118) which have first fluid ports 117 and second fluid ports 119. The first fluid ports 117 align with first column ports 127 and the second fluid ports 119 align with second column ports 121. In one example of use, fluid would enter through port 114B and enter the conduit of column 110B (i.e., the column 110A-B is hollow, forming a conduit). To actuate the robot gripper 100, the fluid is forced into the first chambers 116 to expand the first chambers 116 (similar to a bellows). In other words, fluid enters through port 114, travels through the conduit, and flows through first column ports 119 which are aligned with first fluid ports 117, allowing the fluid to enter the first chambers 116). As the pressure of the fluid increases (i.e., pneumatic pressure), the first chambers 116 expand. This is accomplished using materials that are elastomeric in nature and that generally fall within the range of 50A to 98A durometer hardness. As the first chambers 116 expand, the first ends 120 of the fingers 106 are forced outward (see FIG. 11 for an example). As the first ends 120 of the fingers 106 move outward, the distal ends 122 of the fingers 106 (which may have tips 125 thereon) pivot inward, reducing the distance between the distal ends 122 and tips 125 of fingers 106. This allows the tips 125 to grip items, such as the ball 126 shown in the drawings. This pivoting action is the result of a solid section 124 that separates the first chambers 116 from the second chambers 118. In the above example, because the second chambers 118 are not filled with fluid and are flexible, the distal ends 122 of the fingers 106 easily close. It will be appreciated that the force with which the fingers 106 are actuated is a function of the pressure of the fluid applied to the first chambers 116. Likewise, the distance between the distal ends 122 of the fingers 106 is easily controlled by controlling the fluid pressure. As such, by simply varying the pressure of the fluid entering the first chambers 116, the gripping strength can be customized to a user's needs. This allows a user to grip delicate items, which is a problem in the prior art. Further, fluid may be withdrawn from the first chambers 116 and added to the second chambers 118 (fluid enters through base port 114A and follows a similar path as that described earlier), which would increase the speed with which the distal ends 122 of fingers 106 open. The distance of the opening may also be controlled using a distance-controlling plate 123. In other words, as the end of the fingers proximal the base 102 move inward, they come into contact with the distance-controlling plate 123, which prohibits the fingers from exceeding a predefined distance. However, a distance-controlling plate is not required. Further, the coupling plate 113 may also be used to prohibit the finger tips 125 from coming too close, according to the desires of the project. This may be desirable to prohibit accidental crushing of the item being gripped. Again, however, no such plate is required. If no fluid is added to the second chambers 118, the distal ends 122 of fingers 106 will still open (i.e., the distance between the respective distal ends will increase) due to the elasticity of the chambers 116, 118. In other words, as chambers 116 are emptied, they will return to their natural state, along with the second chambers 118. Should a user need a wider opening, fluid may be added to the second chambers 118 (see FIG. 12 as an example). Likewise, in at least one embodiment, the distance between the distal ends 122 may be increased by using a vacuum on first chambers 116. As first chambers 116 collapse, the distal ends 122 separate. It will be appreciated that there are several benefits of the above disclosed robot gripper 100, including that it has less parts to manufacture, less moving parts to malfunction, it has no sliding parts (which eliminates friction), allows for partial closure by varying the pressure, allows the fingers 106 to move in unison due to equal chamber pressure, and is lighter in weight, among other benefits.

Figure 10:
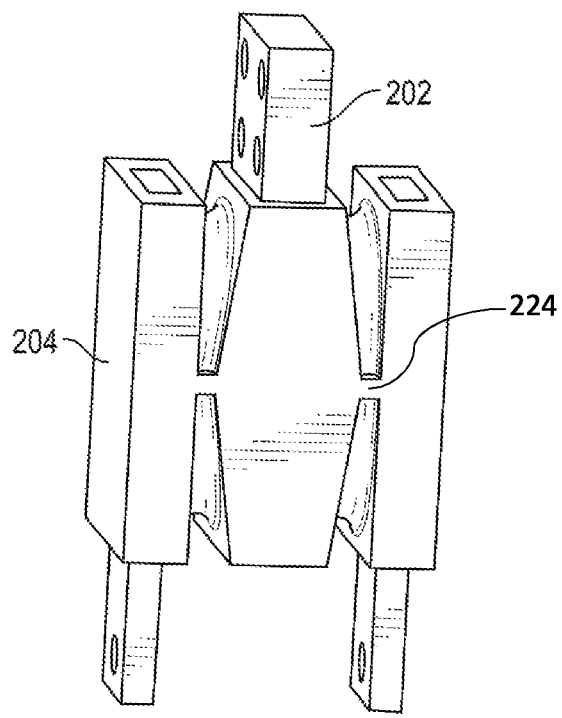
FIG. 10 is a perspective view of a robot gripper in a natural position.
Figure 11:
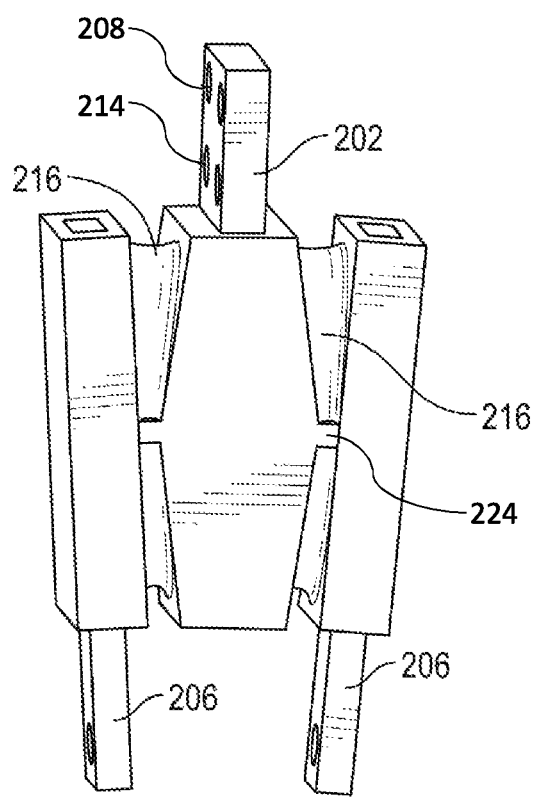
FIG. 11 is a perspective view of a robot gripper in a first actuated position.
Figure 12:
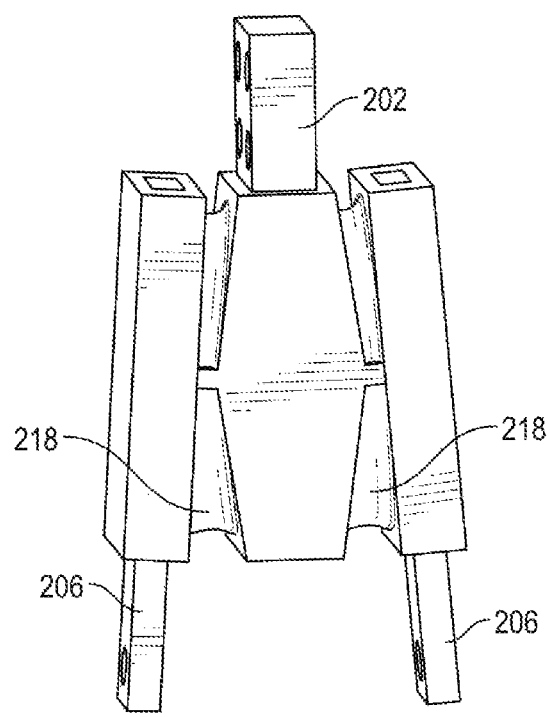
FIG. 12 is a perspective view of a robot gripper in a second actuated position.

As shown in FIGS. 1-9, the base 102 is perpendicular to the column 110. However, such configuration is not required. For example, in one embodiment, as shown in FIGS. 10-12, the base 202 extends longitudinally from the column 210. As shown, mounting holes 208 and connection ports 214 are on the side of the base 202. Either embodiment may be of single manufacture, allowing the fluid to easily flow therethrough. Further, in one embodiment, as shown in FIG. 11, solid section 224 may be rigid to aid in pivoting. The rigidness may be in the range of 50 D to 80 D durometer hardness with the chambers being 50A to 98A durometer hardness. Note that solid section 224 may be of the same rigidness of the housing 204, but may also be more rigid than the housing 204 to aid in pivoting. FIG. 10 illustrates a robot gripper in a natural state, FIG. 11 illustrates first chambers 216 expanded with the distance between fingers 206 lessened, and FIG. 12 illustrates the second chambers 218 expanded, with the fingers 206 separated by a greater distance.

Figure 13:
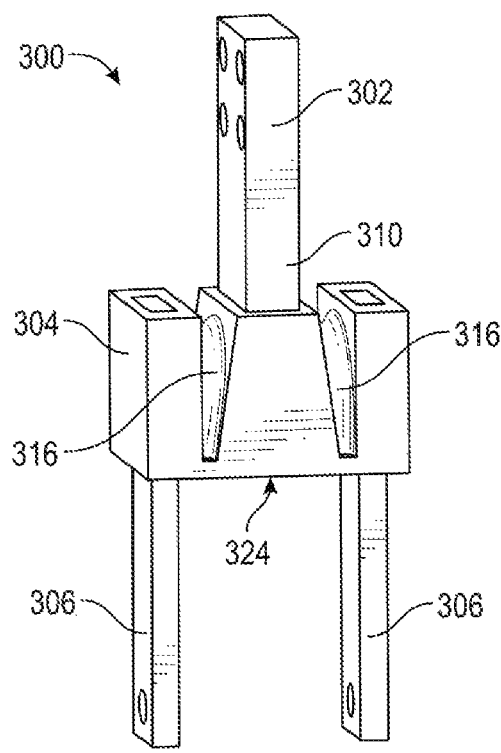
FIG. 13 is a perspective view of a robot gripper with two chambers.
Figure 14:
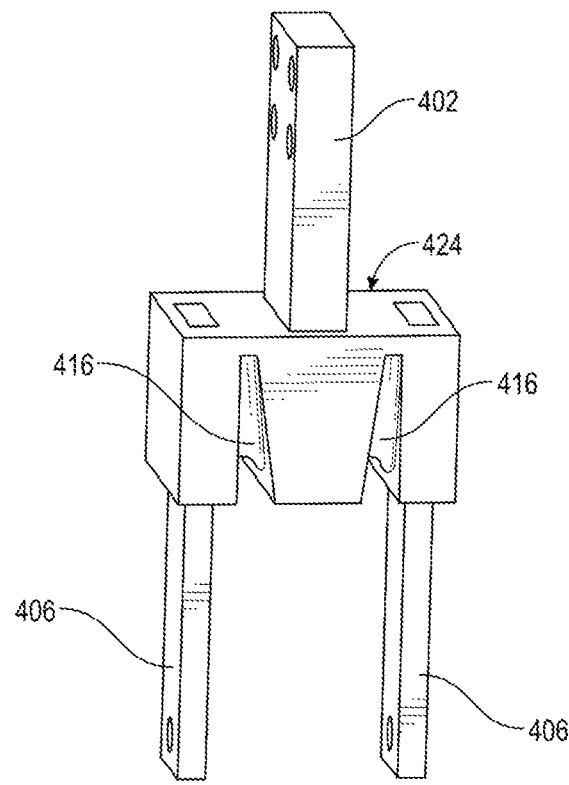
FIG. 14 is an alternative configuration of a robot gripper with two chambers.

It will be appreciated that any number of configurations of the present invention are possible. For example, while FIGS. 1-12 illustrate four chambers, more or fewer chambers may also be used. For example, FIG. 13 illustrates a robot gripper 300 that comprises a base 302 that forms the column 310, two flexible chambers 316, and two fingers 306. Because the housing 304 of robot gripper 300 only comprises two chambers 316 with a solid section 324 at the base thereof, when chambers 316 are expanded (i.e., using fluid or air), the fingers 306 pivot on the solid section 324 and close together at an end distal to the chambers 316, causing a gripping action. Again, a vacuum may also be used to collapse the chambers 316, causing the fingers 306 to separate. As shown in FIG. 14, the placement of the solid section member 424 may alter the direction of the fingers 406 when the chambers 416 are expanded. In other words, when chambers 416 expand, solid section member 424 causes the fingers 416 to pivot outwardly at a distal end due to the placement of the solid section 424 being proximal to the base 402 instead of distally therefrom, as illustrated in FIG. 13. In this configuration, vacuum pressure may also be used to collapse chambers 416, thereby closing the fingers 406.

Figure 15:
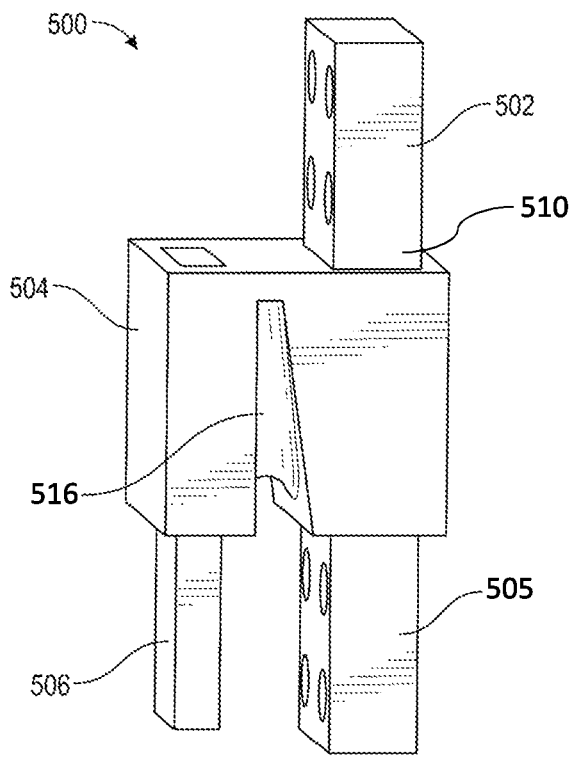
FIG. 15 is a perspective view of a robot gripper with a single chamber.
Figure 16:
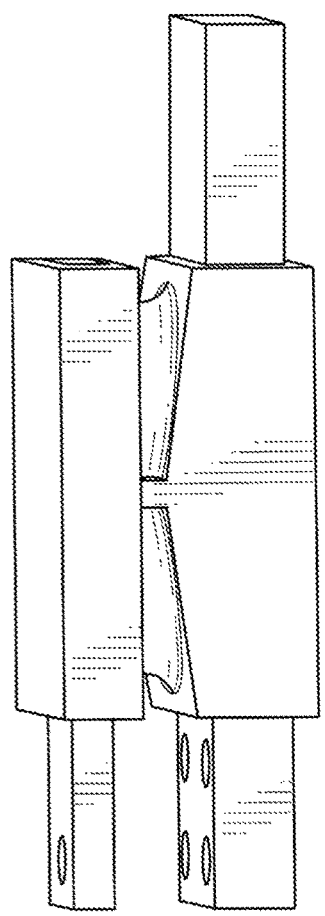
FIG. 16 is a perspective view of a robot gripper with two chambers in an alternate configuration.

It will further be appreciated that several combinations of chambers and fingers may be used and configured. For example, FIG. 15 illustrates a robot gripper 500 where the support base 502 and column 510 further comprise a column finger 505. The housing 504 comprises a single chamber 516. Because the combined column 510 and base 502 function as a non-moving column finger 505 as well, the finger 506 and column finger 505 grip objects. In other words, if vacuum pressure is applied to chamber 516, the chamber collapses, which causes finger 506 to move toward column finger 505. It will be appreciated that two chambers may be used as well, as shown in FIG. 16. Therefore, it will be understood that a robot gripper may comprise at least one finger, at least one chamber, and at least one base and column.

Figure 17:
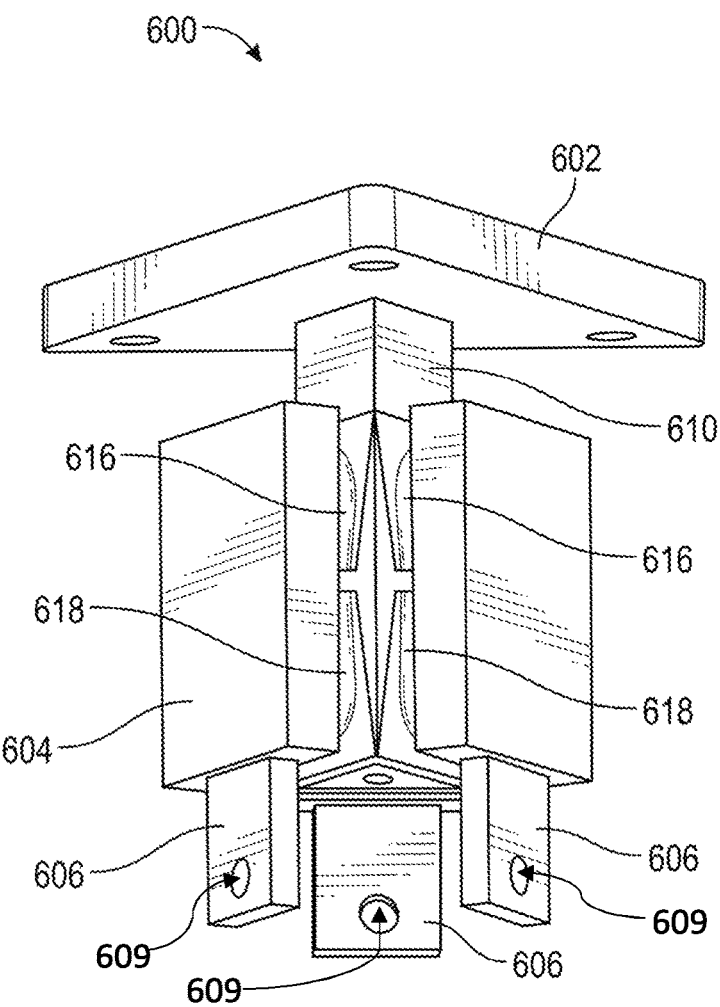
FIG. 17 is a perspective view of a robot gripper with six chambers and three fingers.
Figure 18:
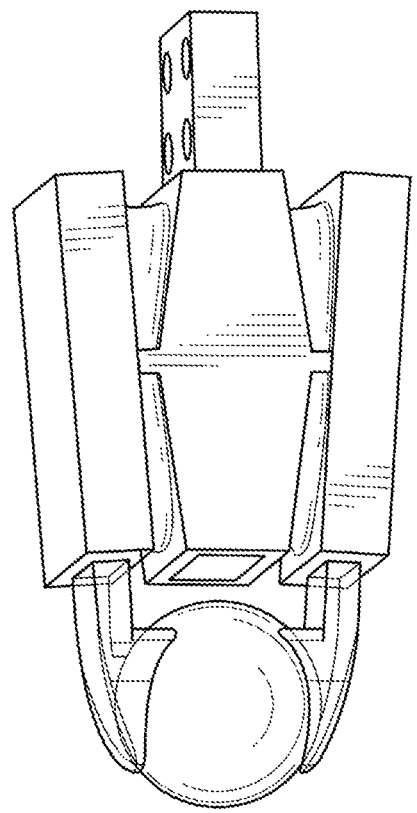
FIG. 18 illustrates a customized pair of finger tips for gripping round objects.
Figure 19:
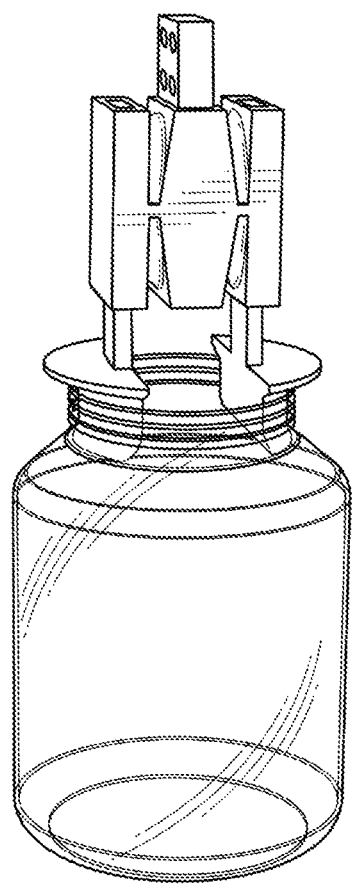
FIG. 19 illustrates a customized pair of finger tips for gripping open containers.

It will also be understood that more than two fingers may also be used. For example, FIG. 17 illustrates a robot gripper 600 having a base 602 with connection ports (not visible), a housing 604 having a plurality of first chambers 616 and second chambers 618, a plurality of fingers 606, and a column 610. The benefit of more than two fingers 606 allows the gripper 600 to pick up a variety of items that two fingers wouldn't adequately hold. FIGS. 18-19 show that the fingers may also take any shape desired by a user. For example, the fingers may be customized to pick up a variety of objects, including rounded objects as shown in FIG. 18, or jars/glasses from the inside as shown in FIG. 19, or any other shape desired by a user. Further, as shown throughout the drawings, but referring to FIG. 17 specifically, the fingers 606 may have coupling apertures 609 allowing a user to easily change the gripping portion of the fingers 606 to the desired shape. In other words, as a means for having interchangeable tips, various-shaped tips could be bolted or otherwise coupled (tongue and groove lock, snap, spring loaded button, etc.) to the fingers 606, allowing for customization of use.

Figure 20:
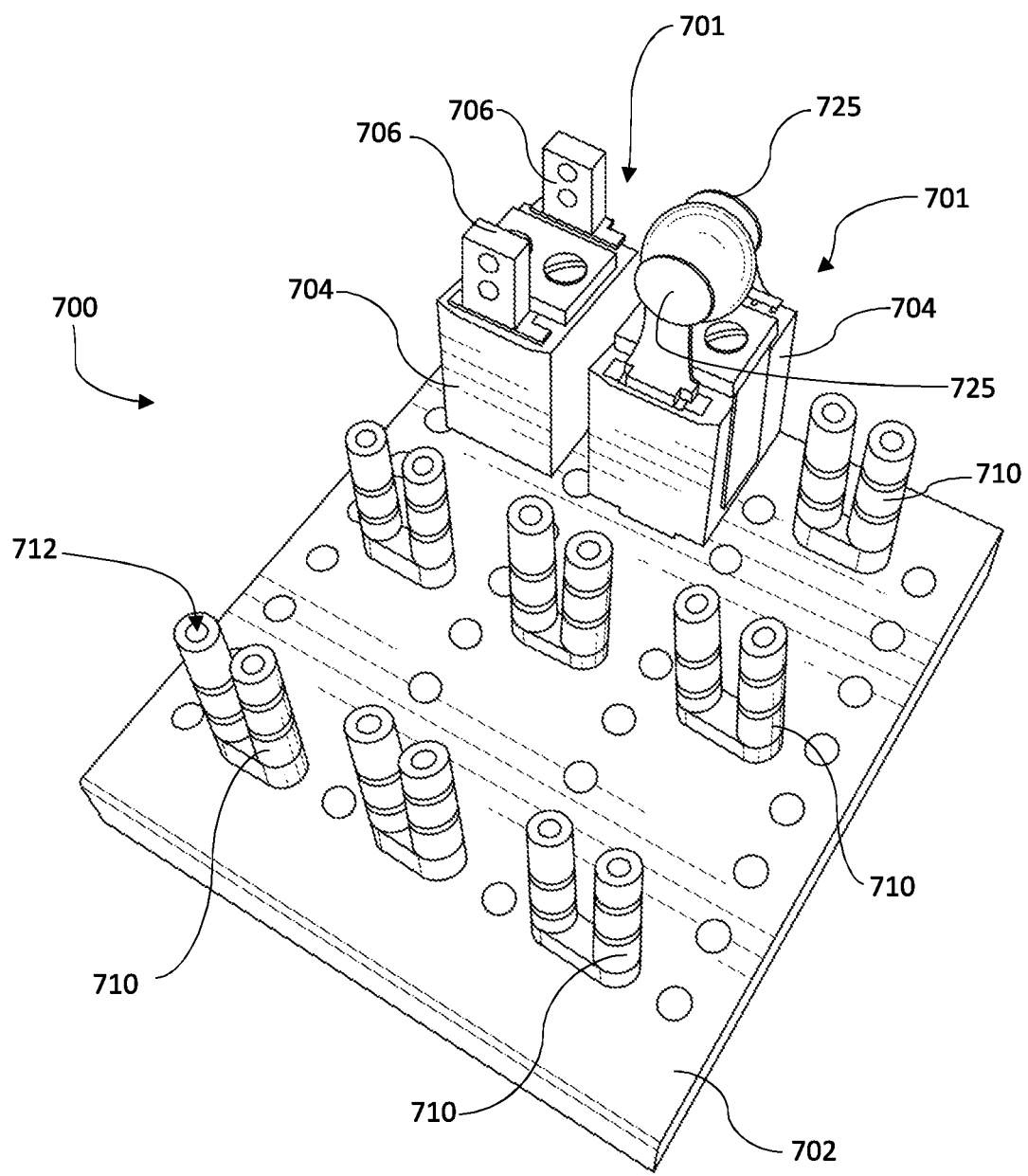
FIG. 20 illustrates a top perspective view of an array of robot grippers.
Figure 21:
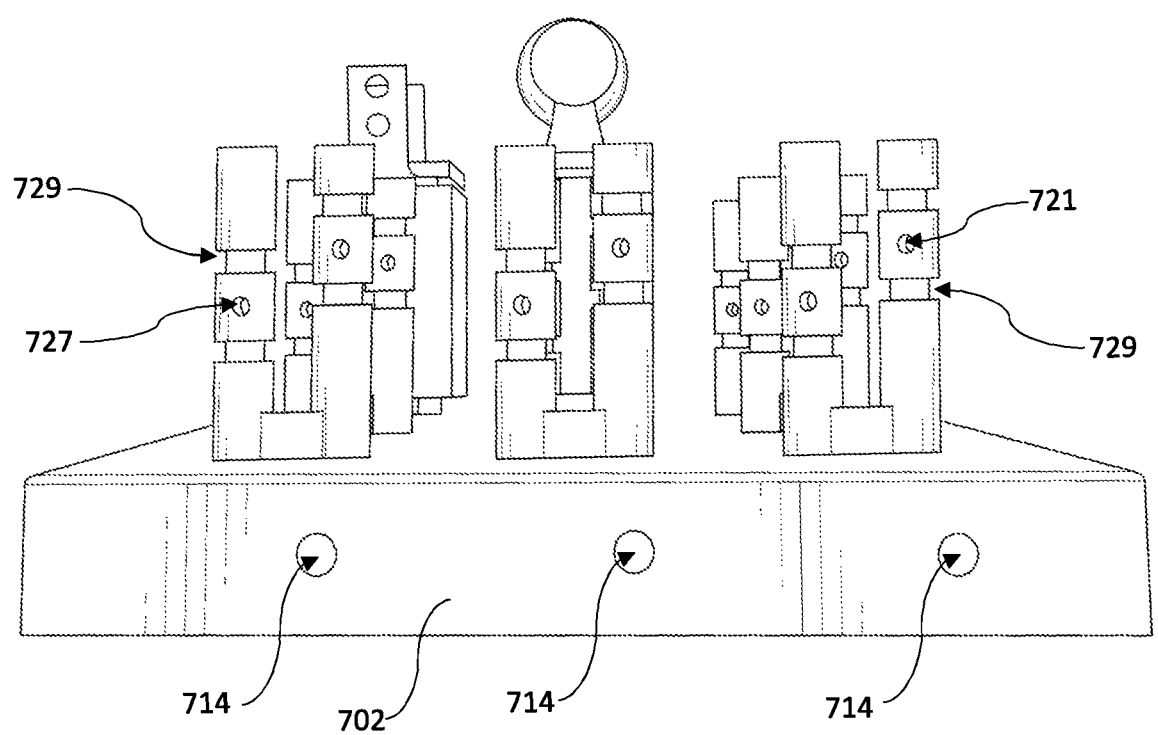
FIG. 21 illustrates a side elevation view of an array of robot grippers.

In yet another embodiment, as shown in FIGS. 20-21, a robot gripper 700 comprises an array of grippers 701, each gripper 701 comprising a plurality of housing members 704 coupled to a plurality of fingers 706, and an array of columns 710. Each housing member 704 comprises one or more chambers (not visible in this view). In one embodiment, each column 710 has a connection ports for each column 710, such as ports 714 (other ports opposite the columns not visible in this view), through the base 702 for the passage of fluid therein through a conduit 712 of the columns 710. In another embodiment, base 702 comprises only two ports: one for actuating a plurality of first chambers and one for actuating second chambers. While not visible in this view, the first chambers and second chambers are understood to be the same as first chambers 116 and 118 (e.g., FIG. 8). For example, fluid travels through the two connection ports in the base 702 and into one or more channels within the base 702, each channel leading to a conduit in the columns 710 and to the chambers of each gripper 701 through column apertures 721, 727 accordingly. As shown, the column apertures 721, 727 may have o-ring apertures 729 above and below, so as to seal the connection between the apertures 721, 727 and the chambers. The fingers 706 may be tips 725 coupled thereto, allowing for customization of grip. As will be appreciated, the chambers 716, 718 would expand and contract simultaneously in such a scenario because of the equalized pressure. While each gripper 701 is illustrated understood as having four chambers each (similar to those shown in FIG. 8), such configuration is not required and each gripper may be similar to other embodiments disclosed herein. Further, while the fingers have been shown throughout the drawings as insertable within finger channels, the channels are not required. In other words, the fingers may be coupled to the outside of the housing, rather than being inserted into the housing using finger channels. Screws, adhesives, or other securing means may be used to couple the fingers to the outside of the housing. Such modifications are contemplated herein.

The array of grippers disclosed above has several advantages over the prior art. Currently in the art, an array of grippers requires that each gripper has a set of connection ports and associated hardware. This increases complexity, weight, and cost for each array. In contrast, the array disclosed above may function using a single connection port. In other words, because the base has channels passing therethough to the conduit of each column 710, one connection port can control each gripper in the array simultaneously. Because only one connection port is required, the weight of the end-of-arm assembly is reduced. Weight is important in robotics due to acceleration forces, and weight is most critical in the end-of-arm assembly due to the moment arm. The materials and cost are also thereby reduced. Therefore, the array disclosed herein is a significant improvement over the prior art.

While the foregoing examples have described a conduit running through the column, such configuration is likewise not required. The conduit for passing fluid to the chambers may be separate from the column without departing herefrom.

It is appreciated from the foregoing that the robot gripper described herein solves the need for a robot gripper that is relatively inexpensive to manufacture, has few moving parts, no sliding parts, that maintains uniformity in gripping, and that may be slowly or partially actuated for gripping delicate objects.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A robot gripper, comprising:
   a housing, the housing comprising at least one flexible chamber, at least one finger channel, and at least one column channel, the at least one flexible chamber interposed between the at least one finger channel and the at least one column channel;
   at least one finger, the at least one finger receivable within the at least one finger channel; and
   at least one column receivable within the at least one column channel, the at least one column comprising a base with one or more connection ports, at least one conduit in communication with the respective connection ports, and one or more column ports for access to the respective conduits, each column port aligning with a respective fluid port on the at least one flexible chamber;
   wherein when a fluid passes through the one or more connection ports on the base, through the respective conduit in the one or more columns, and into the one or more flexible chambers via the respective fluid ports, the one or more flexible chambers expand, forcing the at least one finger channel and the at least one finger to pivot in relation to the at least one column.

2. The robot gripper of claim 1, comprising a first upper flexible chamber and a first lower flexible chamber on a first side of the housing, a second upper flexible chamber and a second lower flexible chamber on a second side of the housing; two columns interposed between the flexible chambers on the first side and the flexible chambers on the second side; and, a first finger coupled to the first side of the housing, and a second finger coupled to the second side of the housing.

3. The robot gripper of claim 2, wherein the first upper flexible chamber and the second upper flexible chamber are actuatable independently of the first lower flexible chamber and the second lower flexible chamber.

4. The robot gripper of claim 3, wherein when the first upper flexible chamber and second upper flexible chamber are each actuated in an outward direction, the first finger and second finger pivot inwardly, and, when the first lower flexible chamber and second lower flexible chamber are each actuated in an outward direction, the first finger and second finger pivot outwardly.

5. The robot gripper of claim 1, further comprising a distance-controlling plate.

6. The robot gripper of claim 1, wherein the at least one column and the at least one finger comprise a rigid material.

7. The robot gripper of claim 1, wherein the at least one flexible chamber is in the range of 50A to 98A durometer hardness.

8. The robot gripper of claim 1, wherein the at least one finger is removably coupleable to the at least one finger channel of the housing.

9. The robot gripper of claim 1, wherein the at least one finger comprises a means for interchanging tips.

10. The robot gripper of claim 1, wherein the base comprises a plurality of columns forming an array, the plurality of columns insertable into respective column channels of a plurality of housings.

11. The robot gripper of claim 10, wherein the base comprises channels, the channels connecting the connection ports to the respective conduits of each column.

12. A robot gripper, comprising:
    a plurality of housings, each housing comprising a plurality of finger channels, a plurality of column channels, and a plurality of flexible chambers interposed between the plurality of finger channels and column channels;
    a finger receivable within each of the finger channels; and
    a base comprising a plurality of ports, each port leading to one or more columns, each column receivable within the respective column channels of the housing, each column further comprising a conduit and a column port, the column port in fluid communication with the respective flexible chamber;
    wherein the flexible chambers are actuated by applying fluid pressure or vacuum pressure to the plurality of ports of the base.

13. A robot gripper, comprising:
    a housing, comprising:
      a first upper flexible chamber having an upper fluid port and second upper flexible chamber having an upper fluid port;
      a first lower flexible chamber having a lower fluid port and a second lower flexible chamber having a lower fluid port; and
      a first column channel and a second column channel both separating the first upper flexible chamber and the first lower flexible chamber from the second upper flexible chamber and second lower flexible chamber;
    a base, comprising:
      a first base port leading to a first conduit in a first column;
      a second base port leading to a second conduit in a second column;
      the first column insertable into the first column channel and the second column insertable into the second column channel;

the first column comprising upper column ports alignable with the upper fluid ports of the upper flexible chambers; and the second column comprising lower column ports alignable with the lower fluid ports of the lower flexible chambers;

a first finger coupled to a first side of the housing, and a second finger coupled to a second side of the housing, each finger having a distal end that extends beyond the housing;

wherein when a fluid passes through the first base port, through the first conduit, and to the first upper flexible chamber and second upper flexible chamber, the distance between the distal ends of the first and second finger decreases; and when a fluid passes through the second base port, through the second conduit, and to the first lower flexible chamber and second lower flexible chamber, the distance between the distal ends of the first and second finger increases.

* * * * *